US012754978B2

(12) United States Patent
Benedetto

(10) Patent No.: US 12,754,978 B2
(45) Date of Patent: Oct. 6, 2026

(54) VALIDATING A REAL-WORLD OBJECT'S DIGITAL TWIN

(71) Applicant: Sony Interactive Entertainment Inc., Tokyo (JP)

(72) Inventor: Warren Benedetto, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 659 days.

(21) Appl. No.: 17/866,414

(22) Filed: Jul. 15, 2022

(65) Prior Publication Data

US 2024/0020354 A1 Jan. 18, 2024

(51) Int. Cl.
*G06T 17/00* (2006.01)
*G06F 21/10* (2013.01)
*G06Q 30/018* (2023.01)
*H04L 9/00* (2022.01)

(52) U.S. Cl.
CPC ....... *G06F 21/1015* (2023.08); *G06Q 30/018* (2013.01); *G06T 17/00* (2013.01); *H04L 9/50* (2022.05)

(58) Field of Classification Search
CPC ..... G06F 21/1015; H04L 9/50; G06Q 30/018; G06T 17/00
See application file for complete search history.

(56) References Cited

U.S. PATENT DOCUMENTS

| | | | | |
|---|---|---|---|---|
| 2017/0243230 | A1* | 8/2017 | Ross | G06F 21/44 |
| 2020/0184041 | A1 | 6/2020 | Andon et al. | |
| 2021/0110004 | A1* | 4/2021 | Ross | G06F 21/44 |
| 2021/0264444 | A1* | 8/2021 | Chen | G06F 16/54 |
| 2021/0399893 | A1 | 12/2021 | Withrow et al. | |
| 2021/0406575 | A1 | 12/2021 | Wiggeshoff | |
| 2022/0294630 | A1* | 9/2022 | Collen | H04L 9/3213 |
| 2022/0374946 | A1* | 11/2022 | Kass | G06F 16/24578 |
| 2023/0109574 | A1* | 4/2023 | Vosseller | G06Q 30/018 705/317 |
| 2023/0114684 | A1* | 4/2023 | Jakobsson | H04L 9/3213 713/159 |
| 2023/0216682 | A1* | 7/2023 | Lipton | G06Q 30/018 713/172 |
| 2023/0385896 | A1* | 11/2023 | Gonta | G06N 3/094 |
| 2025/0086710 | A1* | 3/2025 | Bai | H04L 9/3239 |

OTHER PUBLICATIONS

Sofia Gakhar, Thesis in Computer Science and Software Engineering at Concordia University, Local image patterns for counterfeit coin detection and automatic coin grading (Year: 2020).*

(Continued)

*Primary Examiner* — Jessica Lemieux
*Assistant Examiner* — Nico L Padua
(74) *Attorney, Agent, or Firm* — Kilpatrick Townsend & Stockton LLP

(57) ABSTRACT

Methods and systems for providing access to a digital twin of a real-world object for use in a metaverse system includes receiving a request to validate the real-world object. The real-world object is validated using a plurality of physical attributes of the real-world object. Upon successful validation, the digital twin is unlocked so as to allow usage of the digital twin in the metaverse system.

20 Claims, 6 Drawing Sheets

(56) References Cited

OTHER PUBLICATIONS

Intl Search Report & Written Opinion, PCT/US2023/069693, dated Oct. 26, 2023, 10 pages.
Qin Wang et al: "Non-Fungible Token (NFT): Overview, Evaluation, Opportunities and Challenges", arxiv.org, Cornell University Library, 201 Olin Library Cornell University Ithaca, NY 14853, Oct. 25, 2021 (Oct. 25, 2021), XP091066331, p. 11-p. 12.

* cited by examiner

VALIDATING A REAL-WORLD OBJECT'S DIGITAL TWIN

TECHNICAL FIELD

The present disclosure relates to using a real-world object within a virtual world, and more particularly to creating a digital twin of the real-world object and using the digital twin in the virtual world.

BACKGROUND OF THE DISCLOSURE

As humans increasingly live their lives online and in virtual worlds (also known as "the metaverse"), there is growing interest in creating digital twins of real-world objects. The idea is that, if a person owns an object in the real world, they should be able to own and "use" that object in the virtual world as well. For example, if the person buys a pair of sneakers of a particular brand in the real world, the virtual world avatar of the person should be able to wear those same sneakers in the virtual world. In other words, a digital character that represents the person can be displayed wearing a digital rendering of the same brand of sneakers that the person owns in the real world.

In order for this to work, there needs to be a way to validate the ownership or at least possession of the real-world object by the person. One way of validating ownership or possession is, for example, by connecting a point-of-sale system used for the sale of the real-world object, such as the specific brand of the physical sneakers, to a metaverse system so that the physical purchase "unlocks" the digital version of the purchase. This can be achieved for new items that are being purchased in a world where such connected systems exist. However, such validation cannot be extended to previously owned items since the connected systems are most recent and did not exist previously.

Furthermore, certain real-world item may be more valuable and hence the ownership of the digital version of such real-world items may have to confer some amount of status or prestige, due to the value of the real-world item. For example, the person can own an original famous painting in the real world, which has a tremendous amount of value due to its rarity (i.e., a one-of-a-kind piece) that is very expensive to purchase, and only the wealthiest few can afford such an indulgence. To preserve the value and maintain the status and prestige of the one-of-a-kind painting, there needs to be a way to validate that a single user owns the physical version of the painting. This validation would reinforce the value of the digital twin.

It is in this context that the various implementations of the disclosure arises.

SUMMARY

Implementations of the present disclosure relate to systems and methods for associating a digital twin of a real-world object to a user for use in a metaverse system. The systems and methods first verify that the user is in possession of the real-world object and is the rightful owner. Upon successful verification, a digital twin is created, if one does not exist for the real-world object owned by the user. The digital twin is represented by a virtual object that includes virtual attributes that mimic the physical attributes of the real-world object. Alternatively, if the digital twin has already been created, the virtual object representing the digital twin is identified. The newly created or the previously created virtual object identified for the real-world object is then unlocked and associated with the user owning the real-world object. The association provides the user with access to the digital twin for use in the metaverse system, including a gaming system. For instance, providing access to the digital twin allows the user to use the virtual object for providing input to a gaming system. Alternatively, the access allows the virtual object to be presented on or controlled by a digital character representing the user in the metaverse system in response to detecting the real-world object on the user.

Any changes in the physical attributes detected in the real-world object are replicated in the corresponding virtual attributes of the virtual object so that the virtual object represents a true replica of the real-world object. In some implementations, some of the physical attributes of the real-world object are filtered to remove any anomalous data, such as flaws caused due to wear-and-tear, prior to determining changes in the physical attributes that need to be updated to the corresponding virtual attributes of the virtual object. In some implementations, one or more of the virtual attributes associated with the virtual object representing the digital twin are normalized by including changes that correspond with changes detected in the corresponding physical attributes of the real-world object. The changes are updated prior to determining the ownership of the real-world object and unlocking of the digital twin. The normalizing of the virtual attributes allows the virtual object to be a true replica of the real-world object. The creation and/or identification of the digital twin for the real-world object allow the user to use the real-world object in the virtual world so as to personalize the digital representation of the user using the digital twin, greatly improving user engagement in the metaverse.

Ownership validation of a real-world object is usually done by connecting a point-of-sale system to the metaverse system so that when the user purchases the real-world object, the purchase "unlocks" the digital version of the real-world object. This connection can be done to validate real-world objects that are newly purchased. However, for real-world objects that the user already owns prior to the point-of-sale system connection, validating the purchase becomes a challenge. In order to allow the user to be able to create and use a digital version of a real-world object owned/purchased by a user prior to connection of the point-of-sale systems, the ownership of the real-world object by the user is first validated. To assist in the validation, data related to a specific instance of the real-world object in the possession of the user is captured in real-time from a plurality of sensors, scanners, and devices. The captured data is analyzed to identify physical attributes of the real-world object. Using the captured physical attributes and machine learning object recognition algorithm trained on data from digital twins, distinct characteristics of the real-world object are identified. The distinct characteristics uniquely identify the specific instance of the real-world object. The real-world object and the user currently possessing the real-world object scanned by the various sensors, are validated, wherein successful validation establishes the user as the rightful owner is validated. Upon successful identification and ownership validation, the digital twin of the real-world object is unlocked to allow the user to use in the metaverse.

In one implementation, a method for providing access to a digital twin of a real-world object in a metaverse system, is disclosed. The method includes receiving a request to validate the real-world object. The real-world object is identified using a plurality of physical attributes defining a distinct fingerprint. The real-world object is validated using the distinct fingerprint, wherein the validation includes verifying the user being a rightful owner of the real-world object. A digital twin of the real-world object is then unlocked for use by the user in the metaverse system, upon successfully validating the real-world object in the possession of the user. The digital twin is represented by a virtual object with virtual attributes replicating the plurality of physical attributes of the real-world object. The unlocking includes associating the virtual object with the user to allow the user to use the virtual object in the metaverse system.

In another implementation, a method for using a real-world object in a metaverse system is disclosed. The method includes identifying the real-world object that is in possession of a user. The real-world object is identified using a plurality of physical attributes defining a distinct fingerprint. Possession of the real-world object by the user is validated. Upon successful validation of the possession of the real-world object, a digital twin of the real-world object is created for use in the metaverse system. The digital twin is represented by a virtual object that is defined using virtual attributes that replicate the plurality of physical attributes of the real-world object. The virtual object is associated with the user to allow use of the virtual object in the metaverse system.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
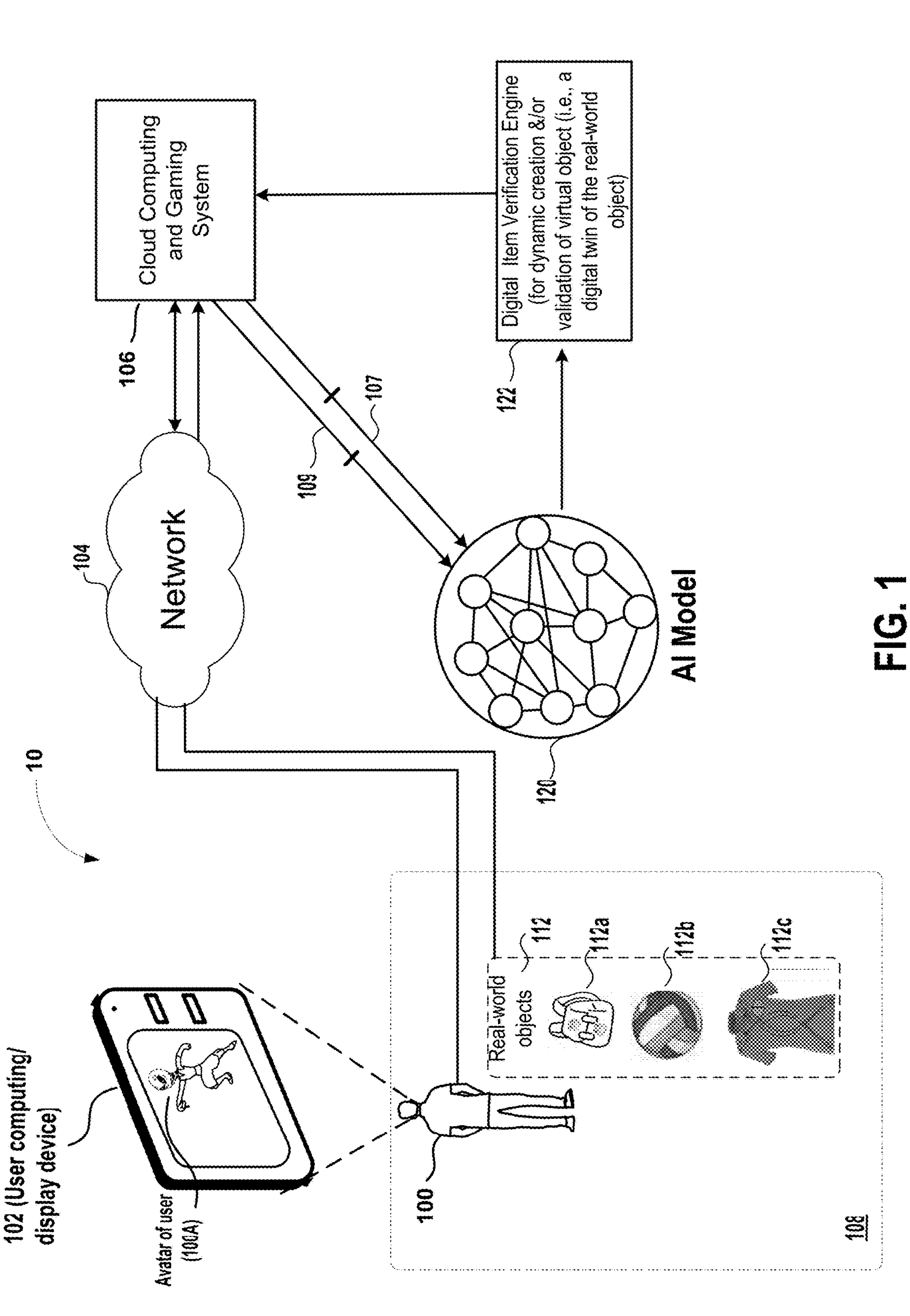
FIG. 1 provides a simplified block diagram of a system used to create and/or validate a digital twin of a real-world object for use in a metaverse system by a user, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As humans are increasingly living their lives online and in virtual worlds, there is growing interest in creating digital twins of real-world objects owned by a user and allow the user to use these digital twins in the virtual world. The digital twin is created to be a digital replica of a real-world object by defining virtual attributes that mimic the physical attributes of the real-world object. The physical attributes of the real-world object are identified using data captured by a plurality of data capturing devices, such as sensors, devices, scanners, etc. For example, the physical attributes can be defined from visual data captured using image capturing devices, audio data captured using audio devices (e.g., microphones, microphone arrays, etc.), physical data including weight, volume, sonar data, x-ray data, magnetic resonance imaging (MRI) data, infrared data, ultrasound data, etc., captured using standard or specialized devices/equipment. The physical attributes are used with machine learning object recognition algorithm to identify the distinct characteristics of an instance of the real-world object to define a unique fingerprint. The unique fingerprint is then used to create a corresponding digital twin of the real-world object, if one is not created already. The digital twin is represented as a virtual object having virtual attributes that match the physical attributes of the real-world object. Upon creation of the digital twin, the digital twin is associated with the user so as to provide the user with access to the digital twin for use in the metaverse system. For example, the digital twin can be used to decorate or render on a digital representation (e.g., an avatar) of the user in a video game or a social media application (e.g., chat application) so as to mimic the user's real-world appearance within the virtual world. In another example, the digital twin can be used to provide input in the video game, or as a collectible asset, or to improve value of the digital assets of the user, etc. The various uses provide the user with the flexibility to customize their virtual world with a digital replica of the real-world objects that they own in the real-world, thereby allowing the user to have a more personalized online presence in the virtual world. Access to the digital twin of a real-world object is provided to the user for use in the virtual world (i.e., metaverse system) after verifying that the user is the actual owner of the real-world object.

Alternately, the digital twin may already have been created for the real-world object and exist in the virtual world. In such cases, the ownership validation is done using the unique fingerprint of the real-world object and upon successful validation, the digital twin is unlocked for the user. Unlocking the digital twin provides the user with access to the virtual object for use in the virtual world.

In some implementations, machine learning algorithm is used to perform the identification and/or validation of the real-world object in the possession of the user. The machine learning algorithm is trained using object recognition algorithm to use the physical attributes of the real-world object to match with the corresponding virtual attributes of a specific one of the virtual objects. The virtual object is the digital twin of the real-world object and can be shown to be in a pristine condition while the real-world object may exhibit certain imperfections or markings that can be attributable to wear-and-tear or manufacturing defects or user customization. In such cases, the physical attributes of the real-world object may not completely match with the corresponding virtual attributes of the virtual object representing the digital twin. In such cases, either the virtual attributes of the digital twin (i.e., virtual object) is updated to include similar flaws or the physical attributes of the real-world object are filtered to remove such flaws prior to comparing the respective attributes to identify the virtual object for the real-world object. Once the match is established, the virtual object pertaining to the real-world object is unlocked to allow the user to use the virtual object in the metaverse system.

With the general understanding of the disclosure, specific implementations will be described with reference to the various drawings.

FIG. 1 illustrates an embodiment of a system 10 for interacting with an interactive application, such as a video game, via a user computing device 102. In some implementations, the user computing device 102 may be a desktop computer, or a mobile computing device, such as a portable game player, a smart phone, a laptop computer, a notebook computer, a tablet computer, a book reader, a PDA, a mobile phone, etc. As shown in FIG. 1, a user 100 is shown physically located in a real-world space 108 playing a video game using the computing device 102. The interactive application with which the user 100 is interacting with is not restricted to a video game but can include any other type of interactive application, including chat application, social media application, etc. In one implementation, a cloud computing and gaming system 106 maintains and executes the video game played by the user 100. A first portion (e.g., device portion) of the interactive application executes on the user computing device 102 while a second portion (e.g., server portion) of the interactive application executes on a server (not shown) that is part of the cloud computing and gaming system 106. Inputs provided by the user via the computing device 102 or controller (not shown) are transmitted to the cloud computing and gaming system 106 over the network 104.

In the illustrated implementation, the computing device 102 is shown to be wirelessly connected to the cloud computing and gaming system 106 over the network 104. In other implementations, the computing device 102 may communicate with the cloud computing and gaming system 106 wirelessly through alternative mechanisms or channels such as a cellular network (not shown) or through wired connection. In some implementations, the cloud computing and gaming system 106 is configured to process the inputs 109 transmitted by the computing device 102 or controller to affect the state of the executing interactive application, such as the video game. The content output from the executing video game, such as video data, audio data is compressed and transmitted to the computing device 102 for decoding and rendering. The interactive application, in alternate implementations, can be a social media application or chat application or any other application other than the video game, and the content output can include target classes of content, including social media streams, chat streams, interactive narratives, virtual reality experiences, augmented reality experiences, interactive livestreams, other multimedia content, etc.

The user 100 may be associated with a set of real-world objects 112. For example, the user can be associated with a backpack 112*a* that is customized by the user, a soccer ball 112*b* and a polo shirt 112*c* with customized design. These real-world objects may be acquired by the user 100 through purchase, gift, trade, transfer, etc. In response to detecting presence of the user 100 in the real-world space 108, data defining the physical attributes 107 of the real-world objects 112 are captured using sensors, scanners, devices including image capturing devices, and transmitted to the cloud computing and gaming system 106 for processing. The cloud computing and gaming system 106 processes the physical attributes 107 of the real-world objects 112 with the help of machine learning algorithm with an embedded object recognition algorithm to generate and train an artificial intelligence (AI) model 120. The AI model 120 is trained using the captured data of the real-world object to define outputs. Relevant features are extracted from the captured data of the real-world object, appropriate classifiers (not shown) for the relevant features are identified and provided as inputs to the AI model 120 and various outputs are generated. In addition to data related to the real-world object, user data of the user currently possessing the real-world object and of the user known to own the real-world object are extracted from user profile data, appropriate user data classifiers are identified and provided as inputs to the AI model. The user possessing the real-world object can be the same user known to own the real-world object. The outputs from the AI model 120 are used to identify the real-world object 112 and to confirm the ownership of the real-world object 112 as the user currently possessing the real-world object. In addition to identifying the real-world object and confirming ownership, the output from the AI model 120 is used to identify a virtual object with virtual attributes that match the corresponding physical attributes of each real-world object associated with user 100.

Upon confirmation of the ownership of each real-world object 112 and the identification of the corresponding virtual object, the cloud computing and gaming system 106 is configured to unlock the virtual object so that the virtual object can be used in the metaverse system. The unlocking provides the user 100 with access to the virtual object for use in the virtual world, such as the video game. For example, the real-world object can be the polo shirt 112*c* that the user 100 owns and the unlocking of the virtual representation of the real-world object 112*c* (i.e., the digital twin of the polo shirt 112*c*) allows the user or the system to use the virtual representation of the polo shirt 112*c* with the unique design in the video game. One such use can be to adorn an avatar (i.e., digital representation) 100A of the user 100 in the video game with the virtual representation of the polo shirt 112*c*. The cloud computing and gaming system 106 can be configured to automatically update the avatar 100A of the user 100 in the video game upon detecting the user wearing the polo shirt 112*c* when interacting with the video game. In an alternate example, the avatar 100A of user 100 can be updated in response to an input provided by the user 100 while the user is interacting with the video game. In yet another example, instead of adorning the user, the virtual representation of the polo shirt 112*c* can be made available in a virtual marketplace available within the video game for trading, selling, buying or collecting as a valuable asset.

Figure 2:
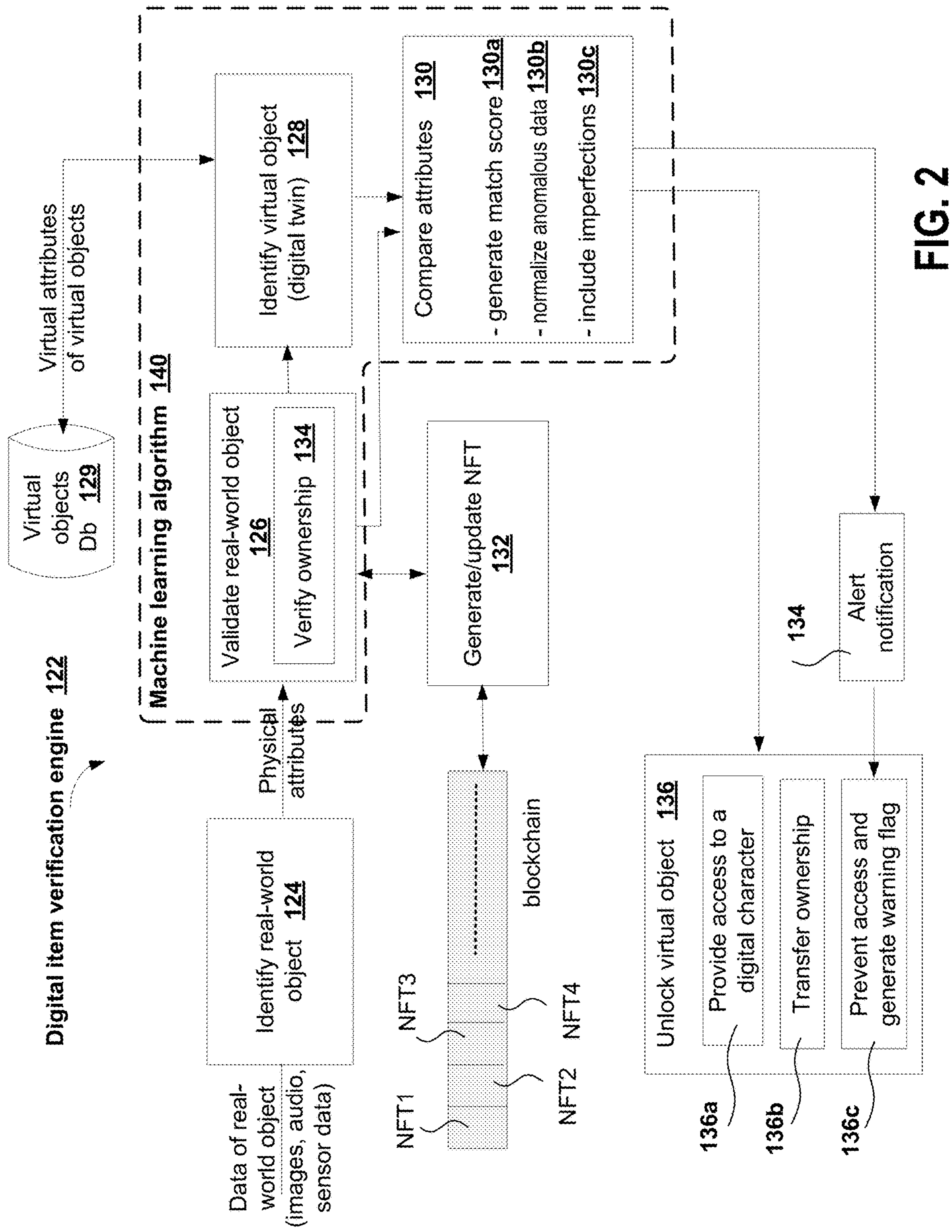
FIG. 2 illustrates various modules of a digital twin verification engine used for creation and/or validation of a digital twin of a real-world object, in accordance with one implementation of the present disclosure.

FIG. 2 illustrates an example digital item verification engine 122 executing at the cloud computing and gaming system 106 that is configured to perform various operations of identifying and/or validating a real-world object owned by a user, in some implementations. The digital item verification engine (simply referred to herein as a "verification engine") 122 first identifies a real-world object in the possession of a user (operation 124). Data related to the real-world object is captured using a plurality of sensors, scanners, image capturing devices, audio devices, etc., that are available within or coupled to the computing device 102 and/or disposed in a real-world space (i.e., user's physical location) 108 where the user 100 is interacting with an interactive application, such as a video game. The various sensors, devices, scanners capture the data in real-time upon detecting the user having the real-world object while they are interacting with the video game. In some implementations, the image data captured by one or more image capturing devices are used to identify the visual data of the real-world object by leveraging a technique like photogrammetry. The images of the real-world object are captured from various angles so as to be able to construct a virtual three-dimensional replica of the real-world object capturing all the visual attributes.

In addition to the visual data captured in the images, other descriptive attributes can also be identified from data captured by a plurality of sensors, audio devices, x-ray machines, sonars, magnetic resonance imaging (MRI) scanners, infrared scanners, ultrasound scanners, etc. The data captured by the various sensors, devices, and scanners are used by the verification engine 122 to identify physical and other attributes (e.g., kinetic, chemical, etc.) of an instance of the real-world object. For example, the physical and other attributes can be used to define a unique fingerprint identifying the various characteristics of the real-world object. For example, the physical attributes can be used to define dimensions, shape, color, texture, luminance, unique identification marks, etc. The kinetic attributes are defined as volume, weight, kinetic energy, etc., of the real-world object.

The physical and other attributes of the real-world object are analyzed to validate a specific instance of the real-world object (operation 126) in the possession of the user. In some implementations, the validation of the real-world object can be two-fold—(a) identifying the specific instance of the real-world object; and (b) determining the ownership of the specific instance of the real-world object. In some implementations, machine learning algorithm 140 with an object recognition algorithm embedded therein is used to identify the specific instance of the real-world object. The machine learning algorithm 140 creates and updates an artificial intelligence (AI) model 120 that is trained using data captured for various virtual objects. The data is used to identify the unique characteristics of each real-world object. For example, if the real-world object is a red ball, then the unique characteristics can include visible characteristics of the red ball, such as the dimensions (e.g., diameter, surface area, etc.), color (e.g., hue, saturation, luminance, etc.), texture, etc. The visible characteristics of the specific instance of the red ball can also include user customization, distinct markings, visible imperfections, etc., that can further distinguish the specific instance of the real-world object. In addition to the visible characteristics, the other attributes can be used to identify other innate characteristics (e.g., weight, volume, etc.) defining physical, kinetic, chemical properties, for example. These characteristics can be used in the metaverse to apply to a digital character or perform certain task or to generate a desirable outcome. The object recognition algorithm is configured to identify the specific instance of the real-world object using the unique characteristics identified by the machine learning algorithm 140 from analyzing the physical attributes of the real-world objects captured by the plurality of sensors/devices.

In addition to the identification of the real-world object, the ownership of the real-world object is also determined using user data of the user obtained from user profile datastore (not shown), in some implementations. In some other implementations, the unique fingerprint of the specific instance of the real-world object is used to generate a non-fungible token (NFT) (operation 132) within a blockchain, which acts as a digital ledger to keep track of the use of the specific instance of the real-world object. The blockchain can be a proprietary or a generic blockchain. In some implementations, the real-world objects and the virtual objects are tracked using NFTs maintained in separate blockchains. In other implementations, the real-world objects and the virtual objects are tracked via NFTs maintained in a single blockchain. In yet other implementations, the blockchain can be maintained separately for each interactive application, wherein the real-world objects and the virtual objects used in the interactive application are maintained and tracked using distinct NFTs. In alternate implementations, the blockchain can be maintained separately for each type of interactive applications. For example, a first blockchain can be used to generate NFTs for tracking the real-world objects and virtual objects used in video games, a second blockchain can be used to generate NFTs for tracking the real-world objects and/or virtual objects used in social media applications, etc.

The blockchain works by registering each transaction representing use of a real-world or virtual object as a separate entry within the blockchain. The data included in the NFT within the blockchain provides sufficient details that can be used to verify the authenticity of the real-world object, past use history, past and present ownership, characteristics of the real-world object or virtual object, physical attributes of the real-world object, virtual attributes of the virtual object, etc. The blockchain maintaining the history of use of the real-world and virtual objects is stored on multiple servers and used to further authenticate the real-world or virtual objects by ensuring that the data contained in the blockchain for a real-world or a virtual object on one server is same as the blockchain data contained for the real-world or virtual object on majority of servers. When a real-world or virtual object is gifted or transferred or acquired by another user, the ownership of the real-world or virtual object is automatically updated to the corresponding NFT in the blockchain using a new block to reflect the current owner. The real-world object identified in operation 124 can be further validated (operation 126) using the details included in the corresponding NFT within the blockchain, wherein the validation includes validating the identity of the real-world object and validating the ownership of the real-world object.

Once the real-world object and the associated owner are successfully validated, a virtual object associated with the real-world object is identified (operation 128) that is already created. In such implementations, the physical attributes of the real-world object are used to query a virtual objects database 129 to identify a virtual object whose virtual attributes match the physical attributes of the real-world object. The identified virtual object is a digital twin of the real-world object. Upon identifying the virtual object for the real-world object, the virtual object is unlocked (operation 136) to allow the user to use the virtual object in the metaverse. As noted, the metaverse can be a virtual gaming world in which the virtual object can be used by a digital representation of the user. The digital representation of the user can be an avatar or a digital icon or a game character. The unlocked virtual object can be clothing, accessories (including fashion accessories), wearable device, etc., that can be used to adorn the digital representation of the user, or can be a game item or accessory that can be used to provide input to the game, etc. The unlocking of the virtual object provides access to the virtual object for use in the virtual world (e.g., video game). In some implementations, the unlocked virtual object can be a virtual representation of a specific instance of a shirt or shoes or a wearable item of clothing/accessory worn by the user. In these implementations, the verification engine 122 can detect the user wearing a specific instance of the shirt, shoes or the wearable item of clothing/accessory when the user is interacting with the video game and, in response, can use the corresponding unlocked virtual object to automatically adorn the avatar of the user in the video game to cause the avatar to mimic the looks of the user. The verification engine 122 thus allows personalization of the user in the virtual world using the digital representation (i.e., virtual object) associated with the real-world object(s). In alternate implementations, the digital twin can be used to adorn the avatar or game character of the user based on an input provided by the user.

Figure 3:
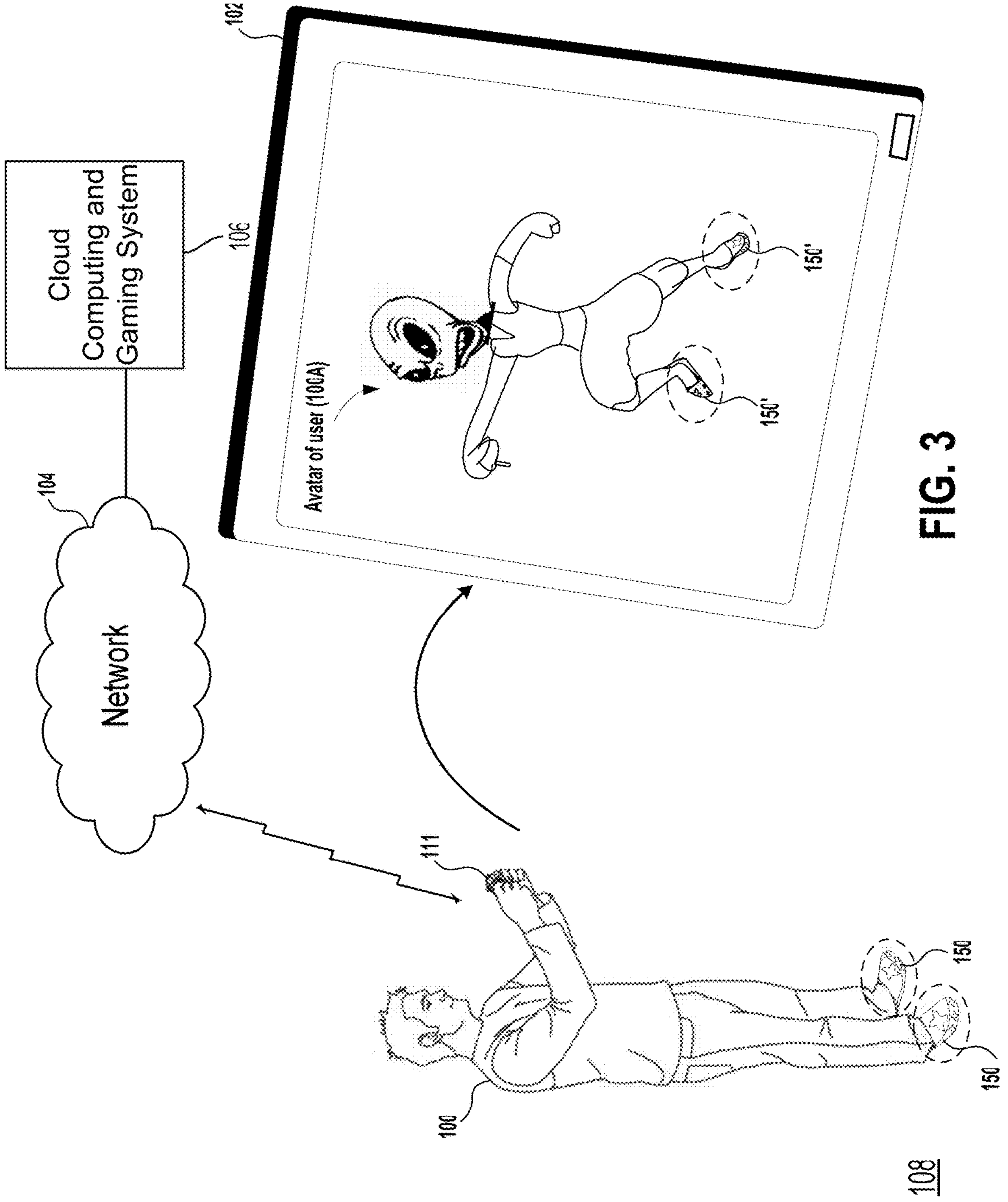
FIG. 3 illustrates an example of a real-world object worn by a user that is replicated on a digital representation of the user in the metaverse system, in accordance with one implementation of the present disclosure.

FIG. 3 illustrates one such implementation in which the digital representation of the user in the virtual world is personalized to mimic the looks of the user in the real-world. As illustrated, user 100 is shown to be playing a video game executing on a cloud gaming system 106 over the network 104 and providing inputs using a controller 111. The video game includes a game character or an avatar 100A representing the user 100. The user is shown to be wearing a specific instance of a pair of shoes 150 that has user customization. The verification engine 122 detects the user wearing the customized pair of shoes 150, identifies a specific instance of virtual pair of shoes 150' from the virtual objects database 129 and unlocks the specific instance of the virtual pair of shoes 150'. In some implementations, the verification engine 122 is configured to use the unlocked specific instance of the virtual pair of shoes 150' to adorn the game character/avatar 100A's feet so as to mimic the look of the user's feet. In alternate implementations, the verification engine 122 is configured to send a signal to the game logic of the video game to adjust the look of the avatar 100A rendering on the display screen 110 and the game logic is configured to adjust the look of the avatar so as to mimic the look of the user's feet. In other words, the adjustment can be done automatically by the verification engine 122 or in response to input from the user 100.

Referring back to FIG. 2, in some implementations, the physical attributes of the real-world object may not perfectly match with the virtual attributes of the virtual object. This may be due to the fact that the virtual object may be a pristine representation of the real-world object while the real-world object may exhibit some imperfections or flaws. In some implementations, depending on the type of real-world object, the imperfections or flaws may be due to wear-and-tear or due to manufacturing defects or due to user customizations. For example, the imperfections can include fading, stretching, tearing, getting soiled or stained, scuffing marks, customized markings, etc., and such imperfections or flaws are captured by the one or more sensors in real time and used to define the physical attributes. Consequently, during the comparison of the physical attributes of the real-world object to the virtual attributes of the virtual objects stored in the virtual objects database 129, a perfect match is not found.

In order to correctly identify the digital twin for the real-world object, the machine learning algorithm may allow for some margin of error for each physical attribute of the real-world object when comparing the respective attributes (operation 130). In some implementations, the allowable margin of error can be based on the nature of the real-world object, including an object class (e.g., clothing can be considered to have a larger allowable margin of error than furniture), general materials used (e.g., fabric can be considered to have a larger allowable margin of error than steel or metal), specific material used (e.g., silk can be considered to have a larger allowable margin of error than cotton), fragility (e.g., glass can be considered to have a larger allowable margin of error than wood), monetary value (e.g., a low value item like a T-shirt can be considered to have a larger allowable margin of error than a high-value item like a Picasso painting), fungibility (e.g., an ordinary coffee mug can be considered to have a larger allowable margin of error than a designer coffee mug, or a sculpture designed by a less-known artist can be considered to have a larger allowable margin of error than a one-of-a-kind sculpture by well-known artist, such as Michelangelo), etc. In some implementations, the real-world object is considered to be a match of a virtual object stored in the virtual objects database 129 so long as each virtual attribute of the virtual object falls within an allowable margin of error defined for the corresponding physical attribute of the real-world object. For example, the real-world object can be a red ball with certain hue, dimension, volume, etc. The color of the red ball can be a little faded, or a little low on air, or the color and circumference (i.e., physical attributes) might not exactly match with the corresponding virtual attributes of a virtual red ball within the virtual objects database 129. In this example, as long as the differences in the color, volume, circumference, etc., between the physical red ball and the virtual red ball are within the allowable margin of error (e.g., within 10%, 12%, etc.) defined for each physical attribute, the virtual red ball is defined to be a match of the physical red ball.

For example, the differences between the physical attributes defining the distinct characteristics of the real-world object and the virtual attributes of the virtual object are used to compute a match score (operation 130*a*). When the computed match score is defined to be within a pre-defined threshold (e.g., 10 or 12%), then the virtual object is declared to be a match. The match score, for example, is computed by identifying a real score for each of the physical attributes identified for the real-world object possessed by the user. The real scores of all the physical attributes identified for the real-world object are consolidated to define a physical total score. Similarly, a virtual score is identified for each virtual attribute identified for each virtual object within the virtual objects database 129. The virtual scores of all the virtual attributes for each virtual object are consolidated to define a virtual total score. The physical total score is compared with the virtual total score of each virtual object to define the difference (i.e., delta). When the difference is within a pre-defined threshold limit, then the virtual object with the total virtual score that corresponds to the difference is declared to be the match for the real-world object.

In some implementations, computing the match score takes into account the margin of error defined for each physical attribute identified for the real-world object, wherein the margin of error is influenced based on the distinct characteristics of the real-world object. In some implementations, the computing of the match score and accounting for the margin of error is done using classifiers. The machine learning algorithm is trained to identify the nature of the real-world object and the margin of error scored for each physical attribute, use these details to compute the match score between the real-world object and each virtual object in the virtual objects database 129, and identify a virtual object with virtual attributes for which the match score falls within a pre-defined threshold (i.e., the match score is within the allowable margin of error). While identifying the virtual object, the ownership of the real-world object is also verified to be user possessing the real-world object. Thus, the digital twin is not necessarily identical to the real-world object as some of the virtual attributes of the digital twin can differ from the physical attributes of the real-world object. In some implementations, there can be an overlap of some of the attributes while the remaining attributes can differ. In these implementations, the virtual object can still be considered as a digital twin of the real-world object so long as the match score falls within the pre-defined threshold.

In some implementations, the differences between the physical attributes and the virtual attributes and the margin of error defined for each physical attribute can be used to alter the digital twin so as to more accurately resemble the real-world object. For example, if the red ball in the possession of the user is faded and its color saturation is off by about 10%, then the color saturation of the virtual object representing the digital twin is altered by about 10% as well so that the virtual object more accurately resembles the real-world object.

In some implementations, upon detecting anomalous data on the real-world object, the physical attributes of the real-world object are normalized (operation 130*b*) prior to determining the match score. In the normalization step, the data of the real-world object captured by the plurality of sensors/devices is first scrubbed of the anomalous data before being compared to the virtual attributes of virtual objects to identify the digital twin. For example, the machine learning algorithm can be trained to recognize the wear-and-tear of the real-world object and exclude such data when comparing the physical attributes to the virtual attributes for identifying the digital twin. For instance, the machine learning algorithm can be trained to identify stains, recognize tears, cracks, holes, etc., and exclude (i.e., filter out) such anomalous data when considering the physical attributes for comparing with the virtual attributes. The virtual data is typically shown to be in pristine condition (i.e., forever flawless) except when certain flaws or markings are intentionally included. As a result, excluding the flaws from the physical object can lower margin of error when computing the match score with the remaining physical attributes.

Figure 4A:
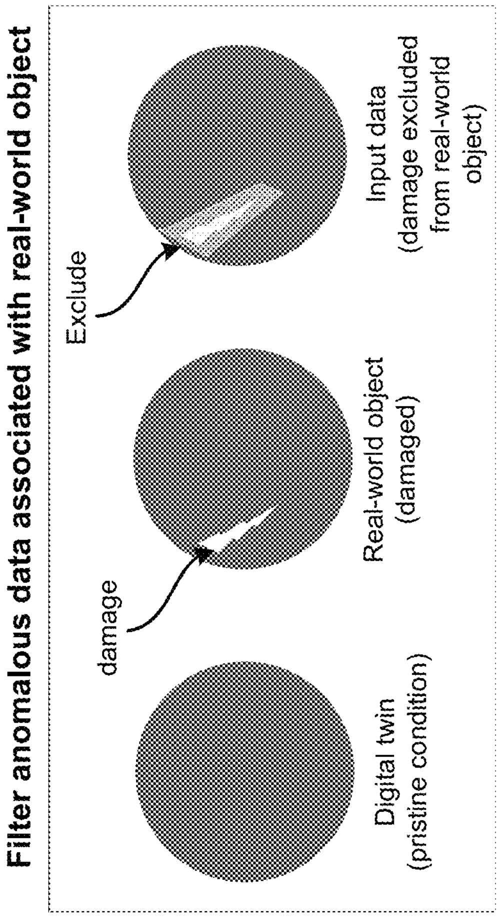
FIG. 4A illustrates an example of a real-world object that is filtered to remove anomalous data prior to verifying against a digital twin, in accordance with one implementation of the present disclosure.

FIG. 4A illustrates one such example of filtering out the anomalous data associated with the real-world object, in some implementations. The real-world object is shown to include some damage in one area, whereas the digital twin is shown to be in pristine condition. Thus, to ensure the proper digital twin is identified, the damage in the area is excluded when computing the match score. The exclusion of the damage would result in the area being damage-free. The exclusion includes adjusting certain ones of the physical attributes to filter out the anomalous data that pertains to the damage so that the adjusted physical attributes pertain to the real-world object without the damage. The resulting real-world object is almost pristine. The physical attributes of the altered real-world object is then used to identify the virtual object, which is in pristine condition.

Referring back to FIG. 2, instead of removing anomalous data related to detected flaws from the real-world object so as to reduce the margin of error, the virtual object representing the digital twin can be altered to incorporate any flaws or special markings detected in the real-world object (operation 130*c*). For example, if the real-world object has a special marking, such as a paint stripe or a splatter of paint, then that special marking is also applied to the virtual object so that the resulting virtual object closely resembles the real-world object. In order to incorporate the flaws or special markings, the verification engine 122 analyzes the special marking or flaw to identify attributes (e.g., location, size, direction, shape, depth, etc.,) and use the identified attributes to update the corresponding virtual attributes of the virtual object that is identified to match the real-world object.

Figure 4B:
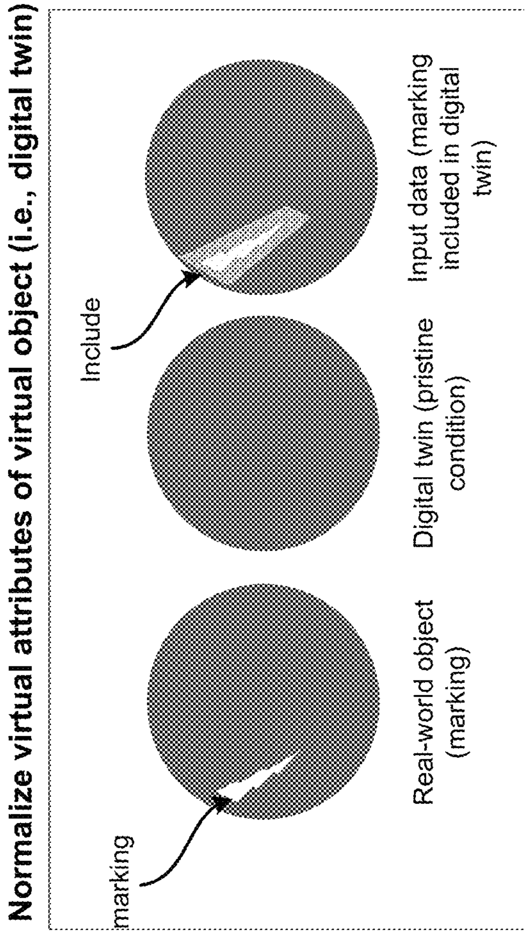
FIG. 4B illustrates an example of a virtual object where one or more virtual attributes are normalized based on corresponding physical attributes of the real-world object, in accordance with one implementation of the present disclosure.

FIG. 4B illustrates one such implementation, wherein the virtual object is shown to be in pristine condition while the real-world object is shown to have a visual damage. In order for the virtual object to be a digital twin of the real-world object, the virtual object is adjusted to include the visual damage identified in the real-world object (operation 130*c*). The adjustment to the virtual object includes updating or adjusting the virtual attributes of the virtual object to include the attributes of the flaw detected in the real-world object so that the virtual object, when rendered in the metaverse (e.g., virtual world of a video game) in accordance to the adjusted virtual attributes, will be a digital twin and show the damage that is similar to the visual damage of the real-world object.

Referring back to FIG. 2, every real-world object will have slight imperfections due to stains, markings, scratches, etc., due to wear-and-tear or manufacturing variability or customizations provided by the user. The machine learning algorithm is used to identify the imperfections to determine margins of error, perform data normalization and/or filtering, and to identify unique characteristics of each instance of the real-world object. For example, a first user and a second user both own a pair of shoes that are of same brand, same color, same style, and same size. From a distance, both pairs of shoes appear identical. However, upon closer inspection, the first pair of shoes owned by the first user can include small black streak of tar at the right hand tip of the right shoe where the first user scraped against the blacktop on the street. Alternately, the second pair of shoes owned by the second user can include paint speckles from an art project on both the right and left shoes. These small deviations from the ideal form define the unique characteristics of each pair of shoes that can be used to distinguish which pair belongs to which user. Once the ownership is established for each pair of shoes (i.e., specific instance of the pair of shoes), the verification engine 122 can provide a digital representation of the respective owner (e.g., digital character or avatar or game character of a video game) with the access to the digital twin of each pair of shoes so as to allow the digital character of the respective owner to use the pair of shoes in the virtual world (operation 136*a*). In one implementation, the digital character is shown to wear the specific instance of the pair of shoes on their feet.

The odds of any two real-world objects having the same imperfections or markings are exceedingly small. The machine learning algorithm can be used to calculate such odds and to declare that the two real-world objects indeed represent two different instances with a high degree of confidence. In addition to distinctly identifying the two different instances, the distinct characteristics including any imperfections can be used to prevent any fraud. For instance, if a specific instance of the real-world object is scanned more than once, the data from the two scans are used to determine if the real-world object was scanned twice by accident, or if it was performed by a second user to whom the real-world object was transferred or if any fraud is being committed. If the two different scans were done by the same user, then it may be established that the second scan was an accident. In this case, the verification engine 122 will recognize that the digital twin of the real-world object was already unlocked for use by the user and prevents unlocking another instance of the digital twin. In some implementations, the verification engine 122 generates and sends out a notification to the user regarding the second scan.

If, on the other hand, the two different scans were done by two different users, then the verification engine 122, in one implementation, determines if the ownership of the real-world object was transferred by a first user to a second user (operation 136*b*). In one implementation, a transfer option may be provided alongside the content of the interactive application on the user's computing device 102, and the first user may have initiated the transfer option to transfer the ownership of the real-world object to the second user. The verification engine 122, in one implementation, checks to see if the transfer option was initiated by the first user for the real-world object and obtains the details of the transfer, such as the identity of the second user, real-world object identifier, time of transfer, etc. In an alternate implementation, the verification engine 122 sends a notification to the first user (i.e., original owner) who unlocked the digital twin requesting them to confirm transfer of ownership of the real-world object to the second user. When the first user confirms that the real-world object was indeed transferred to the second user, then it means that the ownership of the digital twin was also transferred with the transfer of the real-world object, to the second user to allow the second user to use the digital twin in the virtual world (e.g., video game). In some implementations, the verification engine 122 may query the blockchain using the NFT of the real-world object to obtain the details of the transfer. As the blockchain keeps track of the use of the real-world object using the NFT, querying the blockchain provides necessary details of the past owner, the current owner, time of transfer, current location of the current owner, etc. If, on the other hand, the original owner responds that the real-world object was not transferred but was in fact stolen, then the verification engine 122 initiates an alert notification (operation 134). In some implementations, the alert notification is sent to the original owner, who can then alert the proper authorities. In alternate implementations, the alert notification is sent to both the original owner and the proper authorities so that the second user who has stolen the real-world object can be apprehended. As the second user scanning the real-world object for the second time has to have possession of the real-world object, data related to the second user's location can be used to capture the second user and reclaim the stolen real-world object. In some implementations, when the real-world object is flagged as stolen, the verification engine 122 preemptively marks the digital twin as stolen, thereby preventing any user, including the second user from accessing and using the digital twin in the virtual world (operation 136*c*). As a result, when the real-world object is scanned by the second user, an alert notification is automatically sent to the authorities by the verification engine 122 and such notification can be initiated without needing confirmation from the original owner (i.e., the first user).

The NFTs, in addition to keeping track of the use of the real-world object, are also used to preserve the value of the real-world object. The validation of the real-world object and the ownership of the real-world object by verification engine 122 reinforces the value of the corresponding digital twin and also confer upon the digital twin the same status and prestige as the counterpart real-world object. As each instance of a real-world object is recognized and validated, the value associated with the real-world object is conferred to the corresponding digital twin. The various implementations described herein provide users with the flexibility to personalize their virtual world using digital twins of the real-world objects including mimicking the way the users use the real-world objects in the physical world to corresponding use of virtual objects in the virtual world, providing for an interesting digital experience.

Figure 5:
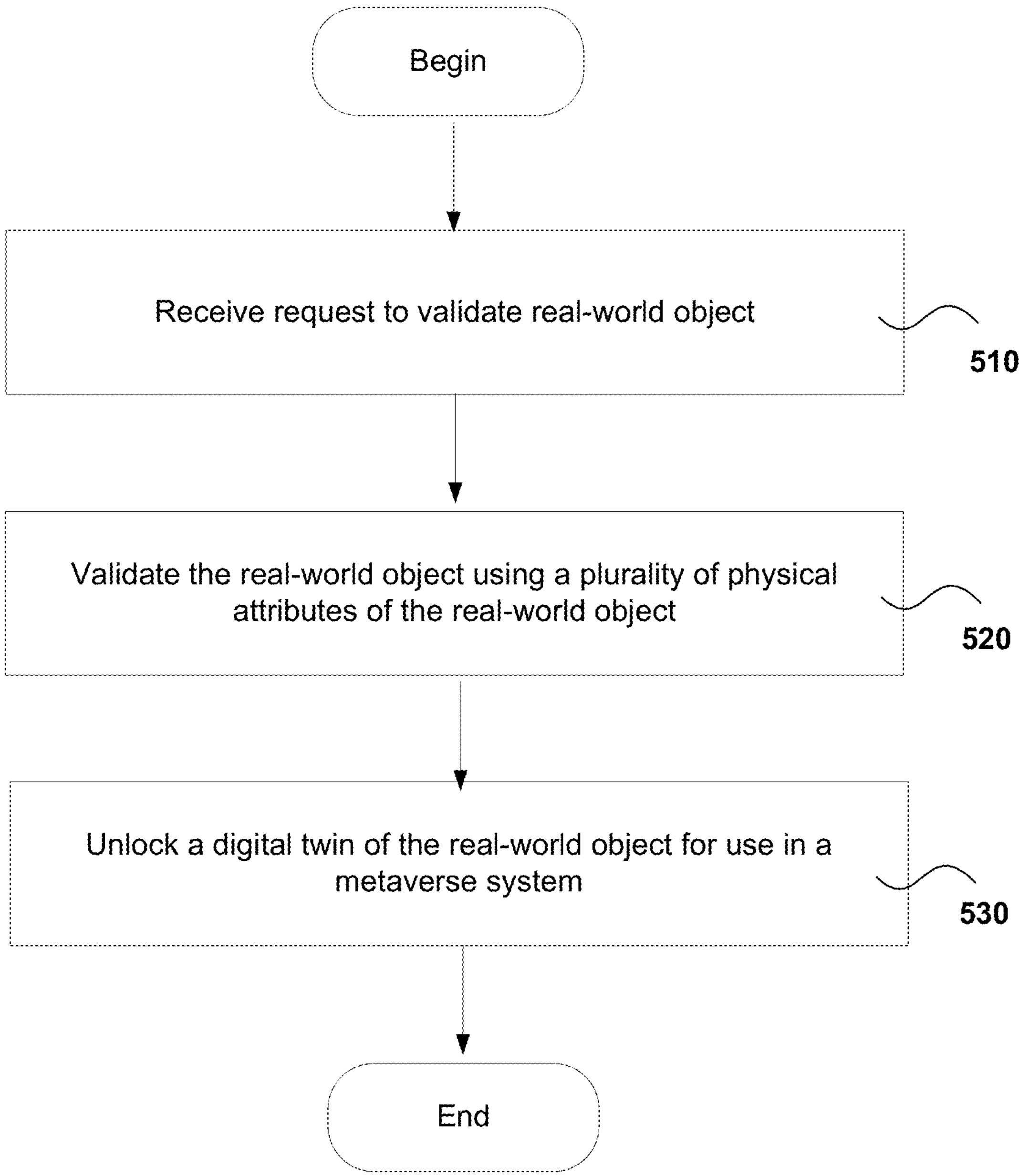
FIG. 5 illustrates a simplified flow of operations of a method for verifying a digital twin of a real-world object in possession of a user, in accordance with one implementation of the present disclosure.

FIG. 5 illustrates flow operations of a method for providing access to a digital twin of a real-world object, in some implementations. The method begins at operation 510, wherein a request for validating a real-world object is received at a verification engine 122. The request can be initiated from a client device by a user having possession of the real-world object. In response to receiving the request, a plurality of sensors and image capturing devices disposed in a client device and in the location of the user are activated. The activated sensors, scanners, devices scan the real-world object and capture data including images from different angles. The data captured by the image capturing devices and sensors are analyzed to identify physical attributes of the real-world object. The physical attributes of the real-world object are used to define distinct characteristics of the real-world object.

The real-world object is validated using the various physical attributes defined from the data captured by the plurality of sensors, scanners and devices, as illustrated in operation 520. The validation includes validating the real-world object and validating ownership of the real-world object. In some implementations, the real-world object is validated using machine learning algorithm. The machine learning algorithm uses object recognition algorithm to recognize the real-world object from the physical attributes defined from the data captured by the sensors, scanners and devices. The ownership of the real-world object is validated, in one implementation, using details included in the NFT of the real-world object maintained in the blockchain. Upon successful verification, a digital twin of the real-world object is unlocked for use in the metaverse system, if the digital twin exists for the real-world object, as illustrated in operation 530. If the digital twin does not exist, then the digital twin is created for the real-world object and associated with the user. The unlocking provides the user with access to the digital twin for use by or on a digital character representing the user in the virtual world of the metaverse system. The digital twin of the real-world object is used by the user to personalize their digital character to mimic their real-world appearance in the virtual world. Other advantages of the present disclosure can be envisioned upon reading the various details provided with reference to the figures.

Figure 6:
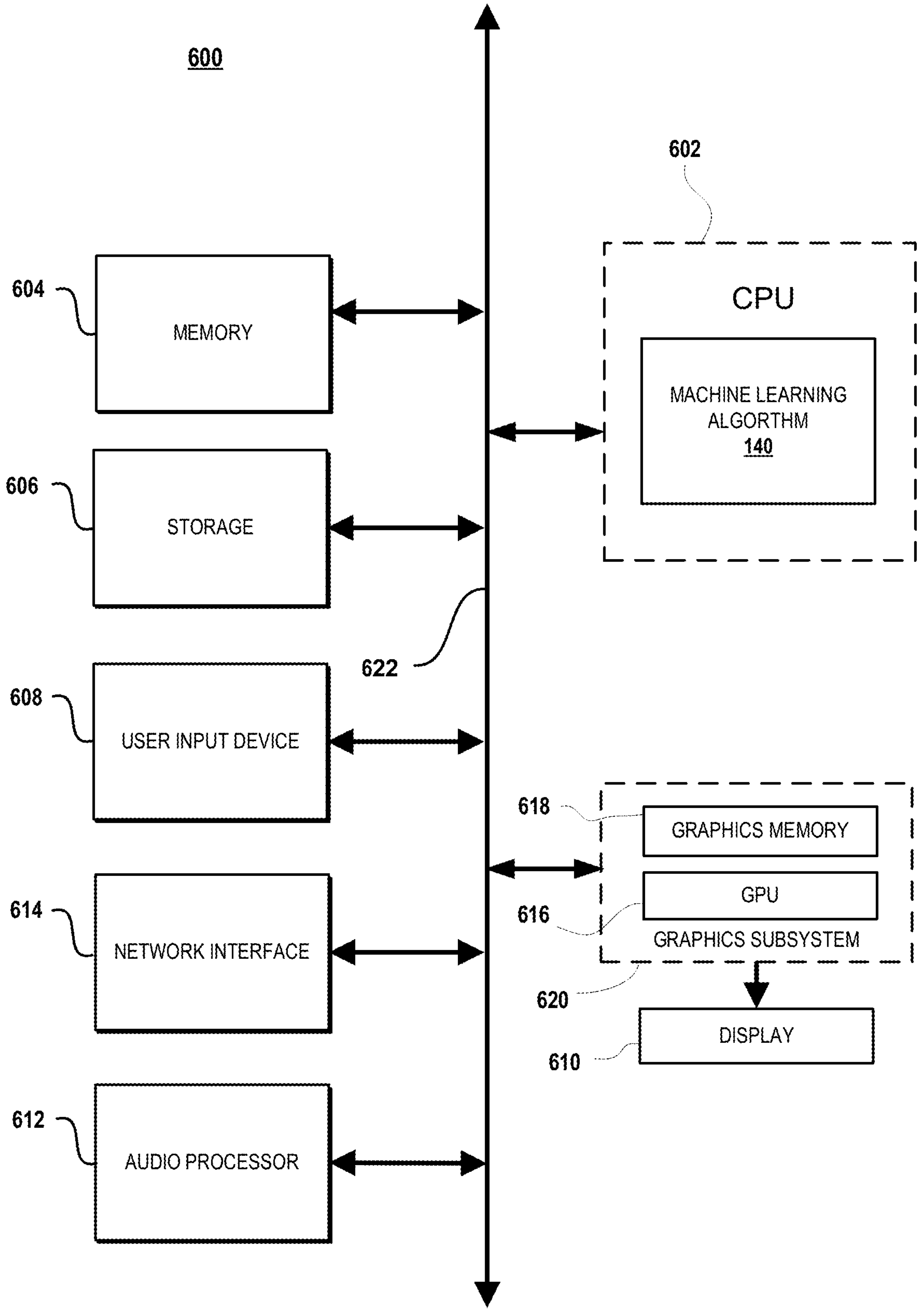
FIG. 6 illustrates components of an example computing device that can be used to perform aspects of the various implementations of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a head mounted display (HMD), a wearable computing device, a laptop or desktop computing device, a server or any other digital device, suitable for practicing an embodiment of the disclosure. For example, the device 600 represents a first device as well as a second device in various implementations discussed herein. Device 600 includes a central processing unit (CPU) 602 for running software applications and optionally an operating system. Further, the CPU 602 can include machine learning algorithm 140 with an object recognition algorithm (not shown) embedded therein to use the physical attributes captured for the real-world object in order to identify the real-world object. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be localized to a player playing a game segment (e.g., game console), or remote from the player (e.g., back-end server processor), or one of many servers using virtualization in a game cloud system for remote streaming of game play to client devices.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 614, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. In addition to display device 610, the pixel data can be projected onto a projection surface. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, embodiments of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method, comprising:

receiving, from a device of a user, a request to validate a real-world object that has a plurality of physical attributes defining a distinct fingerprint;

capturing, using a plurality of sensors including at least one image capturing device, sensor data representing the plurality of physical attributes of the real-world object;

validating the real-world object using the distinct fingerprint, the validating includes verifying ownership of the real-world object by at least:

analyzing the sensor data in a multi-step process, wherein the analyzing comprises:

processing the sensor data with a machine learning algorithm to identify specific physical imperfections within the plurality of physical attributes, the identified physical imperfections corresponding to unique visual data in the sensor data;

determining, based on the identified physical imperfections, a margin of error for validating the real-world object, wherein the margin of error is dynamically influenced by one or more distinct characteristics of the real-world object;

normalizing the sensor data by filtering out, using the machine learning algorithm, anomalous data corresponding to wear, damage, or user-specific markings to produce an attribute set;

calculating, with the machine learning algorithm, statistical odds of two real-world objects having the same identified physical imperfections to confirm the real-world object is a unique instance;

comparing the plurality of physical attributes with virtual attributes of a virtual object representing a digital twin to determine a match score;

declaring, upon the match score being within a pre-defined threshold, the virtual object to be a match of the real-world object in possession of the user, wherein the match score being within the pre-defined threshold triggers a device notification to the user regarding the match score;

unlocking the digital twin of the real-world object for use by the user in a metaverse system, upon successfully validating the real-world object, wherein the digital twin is represented by the virtual object with virtual attributes replicating the plurality of physical attributes of the real-world object, wherein the unlocking comprises associating the virtual object with the user for use in the metaverse system; and controlling, based on the unlocking, a presentation of the virtual object on a display, wherein operations of the method are implemented by a dedicated object recognition module within a secure processor a computing system, wherein the computing system dynamically adjusts computational resources based on a complexity of the sensor data, thereby reducing latency.

2. The method of claim 1, wherein the virtual attributes of the virtual object are automatically updated to replicate changes detected in one or more physical attributes of the real-world object, and wherein the virtual attributes of the virtual object are used to construct a three-dimensional replica of a physical version of the real-world object.

3. The method of claim 2, wherein the automatic updating is performed upon detecting the changes to the one or more physical attributes of the real-world object.

4. The method of claim 1, wherein the plurality of physical attributes correspond to visual data that distinctly identifies the real-world object, and wherein the virtual attributes of the virtual object replicating the plurality of physical attributes of the real-world object are used to construct a three-dimensional replica of a physical version of the real-world object.

5. The method of claim 1, wherein the plurality of physical attributes of the real-world object are identified using any one or combination of visual data captured in images of the real-world object using one or more image capturing devices, or audio data captured using an audio capturing device, or physical data identified using one or more sensors.

6. The method of claim 1, wherein determining the match score comprises:

computing a physical total score for the real-world object by consolidating a real score defined for each physical attribute of the plurality of physical attributes of the real-world object;

computing a virtual total score for the virtual object by consolidating a virtual score defined for each virtual attribute of the virtual object; and computing the match score as a difference between the physical total score and the virtual total score.

7. The method of claim 1, wherein the match score is computed to account for a margin of error defined for each physical attribute of one or more of the plurality of physical attributes of the real-world object and the virtual object representing the digital twin, and wherein the margin of error is influenced by the one or more distinct characteristics of the real-world object and identified using the machine learning algorithm.

8. The method of claim 7, wherein a physical attribute of the plurality of physical attributes influencing the margin of error is used to normalize a corresponding virtual attribute of the virtual object representing the digital twin, so as to cause the digital twin to accurately resemble the real-world object, the normalizing of the corresponding virtual attribute of the virtual object performed using the machine learning algorithm prior to comparing the plurality of physical attributes of the real-world object with the virtual attributes of the virtual object.

9. The method of claim 1, wherein analyzing the plurality of physical attributes further includes filtering out anomalous data included in one or more of the plurality of physical attributes of the real-world object prior to comparing the plurality of physical attributes of the real-world object with the virtual attributes of the virtual object to determine the match score, and wherein the anomalous data identified to correspond with visible imperfections observed in the one or more of the plurality of physical attributes of the real-world object is identified using a machine learning algorithm.

10. The method of claim 1, wherein analyzing the plurality of physical attributes further includes altering the digital twin by updating one or more of the virtual attributes of the virtual object with changes detected in corresponding one or more of the plurality of physical attributes of the real-world object, prior to comparing the plurality of physical attributes of the real-world object with the virtual attributes of the virtual object to determine the match score, the altering performed to cause the digital twin to resemble the real-world object.

11. The method of claim 7, wherein the one or more distinct characteristics include any one or a combination of a type, or a class, or material used, or fragility, or monetary value, or a fungibility of the real-world object.

12. The method of claim 7, wherein the one or more distinct characteristics of the real-world object provide a unique fingerprint of the real-world object, the unique fingerprint used to generate a non-fungible token (NFT) for the real-world object and store the NFT in a blockchain, the NFT used to preserve a value of the real-world object and track ownership and use of the real-world object, the NFT in the blockchain updated to reflect any change in the ownership or use of the real-world object.

13. The method of claim 12, wherein when the real-world object is detected as stolen, the NFT is updated and a flag is generated to indicate the virtual object representing the real-world object as stolen, the flag used to alert the system to prevent use of the virtual object in the metaverse system and the update locks the NFT so as to prevent use of the real-world object.

14. The method of claim 1, wherein unlocking the digital twin comprises, providing the user with an option to transfer ownership of the real-world object associated with the digital twin to a second user, the transfer of ownership providing the second user with access to the virtual object for use in the metaverse system, and providing a notification to the user and the second user of the transfer of ownership of the real-world object to the second user.

15. The method of claim 1, wherein unlocking the digital twin includes providing access to the virtual object for use by a digital character representing the user in the metaverse system.

16. The method of claim 1, wherein the real-world object comprises an indication of damage, wherein the indication of damage is excluded when computing the match score, and wherein excluding the indication of damage comprises adjusting selected physical attributes to filter out anomalous data that pertains to the indication of damage such that the adjusted selected physical attributes pertain to the real-world object without the indication of damage.

17. The method of claim 16, wherein the virtual object is adjusted to include the indication of damage.

18. The method of claim 7, further comprising:

identifying, by the machine learning algorithm, one or more imperfections for determining the margin of error;

performing, by the machine learning algorithm, data normalization and/or filtering; and identifying, by the machine learning algorithm, unique characteristics of each instance of the real-world object.

19. The method of claim 7, further comprising:

calculating, by the machine learning algorithm, odds of two real-world object having the same imperfections; and in response to calculating the odds, declaring, by the machine learning algorithm, whether the two real-world objects are two different instances or a single instance.

20. A method, comprising:

receiving, from a device of a user, a request to validate a real-world object that has a plurality of physical attributes defining a distinct fingerprint;

capturing, using a plurality of sensors including at least one image capturing device, data representing the plurality of physical attributes of the real-world object;

validating the real-world object using the distinct fingerprint, wherein validating comprises verifying ownership of the real-world object by at least:

analyzing, using the plurality of sensors collecting data associated with the real-world object, the plurality of physical attributes based on the collected data to determine the distinct fingerprint;

analyzing the data captured by the sensors in a multi-step process, wherein the analyzing comprises:

identifying, by a machine learning algorithm, one or more visible imperfections, markings, wear-and-tear, or user customizations present in the physical attributes of the real-world object captured by the sensors;

determining, by the machine learning algorithm, a margin of error for validating the real-world object, wherein the margin of error is influenced by one or more distinct characteristics of the real-world object selected from the group consisting of type, class, material, fragility, monetary value, or fungibility;

filtering out, by the machine learning algorithm, anomalous data in the captured data corresponding to stains, tears, cracks, holes, or other imperfections;

normalizing, by the machine learning algorithm, the physical attributes of the real-world object prior to comparison; and identifying, by the machine learning algorithm, unique characteristics of each instance of the real-world object;

in response to analyzing the data, comparing the physical attributes with virtual attributes of a virtual object representing a digital twin to determine a match score, wherein the match score is computed to account for a margin of error defined for each physical attribute of one or more of the plurality of physical attributes of the real-world object and the virtual object representing the digital twin, identifying, by the machine learning algorithm, one or more imperfections for determining the margin of error;

performing, by the machine learning algorithm, data normalization and/or filtering;

identifying, by the machine learning algorithm, unique characteristics of each instance of the real-world object declaring, upon the match score being within a predefined threshold, the virtual object to be a match of the real-world object in possession of the user; and unlocking the digital twin of the real-world object for use by the user in a metaverse system, upon successfully validating the real-world object, wherein the digital twin is represented by the virtual object with virtual attributes replicating the plurality of physical attributes of the real-world object, wherein the unlocking comprises associating the virtual object with the user for use in the metaverse system; and controlling, based on the unlocking, a presentation of the virtual object on a display, wherein operations of the method are performed by a processor of a computing system, wherein analyzing the data and validation are performed by a dedicated object recognition module integrated with a secure processor, and validation results are stored in a protected memory segment to prevent unauthorized access or tampering.

* * * * *